(12) United States Patent
Staats et al.

(10) Patent No.: US 11,662,477 B2
(45) Date of Patent: May 30, 2023

(54) SYSTEM AND METHOD FOR DETERMINING VEHICLE POSITION BY TRIANGULATION

(71) Applicant: Westinghouse Air Brake Technologies Corporation, Pittsburgh, PA (US)

(72) Inventors: Andrew Ryan Staats, Cedar Rapids, IA (US); Stuart John Barr, Cedar Rapids, IA (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 0 days.

(21) Appl. No.: 17/318,764

(22) Filed: May 12, 2021

(65) Prior Publication Data
US 2021/0270976 A1 Sep. 2, 2021

Related U.S. Application Data

(63) Continuation-in-part of application No. 16/193,036, filed on Nov. 16, 2018, now abandoned.

(51) Int. Cl.
*G01S 3/02* (2006.01)
*G01S 19/42* (2010.01)
(Continued)

(52) U.S. Cl.
CPC ............ *G01S 19/425* (2013.01); *G01S 19/43* (2013.01); *G01S 5/0221* (2013.01); *G01S 5/14* (2013.01); *G01S 19/13* (2013.01); *G01S 19/31* (2013.01)

(58) Field of Classification Search
CPC ........ G01S 19/43; G01S 19/425; G01S 19/13; G01S 19/31; G01S 5/14; G01S 5/0221; G01S 2205/00; G01S 2205/01
(Continued)

(56) References Cited

U.S. PATENT DOCUMENTS 5,621,417 A * 4/1997 Hassan .................. G01S 19/09
342/463
5,969,643 A * 10/1999 Curtis ..................... B61L 23/34
340/988
(Continued)

FOREIGN PATENT DOCUMENTS

CA 2151174 C 2/1999
CN 101382431 B 11/2011
(Continued)

OTHER PUBLICATIONS

Dizeu et al. "Comparison of laser triangulation, phase shift triangulation and swept source optical coherence Tomography for non-destructive inspection of objects with micrometric accuracy" AIP Conference Proceedings 2102, 070004 (2019); https://doi.org/10.1063/1.5099804, Published Online: May 8, 2019 (10 pages).

(Continued)

*Primary Examiner* — Chuong P Nguyen
(74) *Attorney, Agent, or Firm* — The Small Patent Law Group LLC; Christopher R. Carroll

(57) ABSTRACT

A system and method for determining the location of a vehicle when GNSS signals are not available use triangulation between one or two radio transmitters and, respectively, two or one radio receivers mounted on the vehicle. The distance between each radio transmitter and/or each radio receiver can be determined according to a phase difference between received radio signals. The radio signals can have the geographical location of the radio transmitter included therein. Utilizing the demodulated geographical location of each radio transmitter and the distance between the radio transmitter and each radio receiver, triangulation can be used to determine the geographical location of the vehicle.

10 Claims, 5 Drawing Sheets

(51) Int. Cl.
*G01S 19/43* (2010.01)
*G01S 19/13* (2010.01)
*G01S 5/14* (2006.01)
*G01S 19/31* (2010.01)
*G01S 5/02* (2010.01)

(58) Field of Classification Search
USPC ..... 342/450, 451, 457, 463, 357.26, 357.51, 342/357.71
See application file for complete search history.

(56) References Cited

U.S. PATENT DOCUMENTS

| | | | |
|---|---|---|---|
| 6,421,587 B2 * | 7/2002 | Diana | B61L 25/025 701/19 |
| 6,492,945 B2 | 12/2002 | Counselman, III et al. | |
| 7,071,843 B2 | 7/2006 | Hashida et al. | |
| 7,756,639 B2 | 7/2010 | Colley et al. | |
| 7,835,863 B2 | 11/2010 | Lokshin et al. | |
| 7,928,905 B2 | 4/2011 | Broadbent | |
| 7,990,314 B2 | 8/2011 | Liao | |
| 8,374,784 B2 | 2/2013 | Mazlum et al. | |
| 8,645,060 B2 | 2/2014 | Venkatraman | |
| 9,208,389 B2 | 12/2015 | Sung et al. | |
| 9,420,412 B2 | 8/2016 | Ho | |
| 9,520,064 B2 | 12/2016 | Tsuda | |
| 9,829,560 B2 * | 11/2017 | Moshfeghi | H04W 64/006 |
| 9,864,064 B2 | 1/2018 | Ishigame et al. | |
| 9,945,931 B2 * | 4/2018 | Allen | G01S 19/48 |
| 10,145,690 B2 | 12/2018 | Koshiba et al. | |
| 10,324,187 B2 | 6/2019 | Smits | |
| 10,354,228 B2 | 7/2019 | Paulsen et al. | |
| 10,884,133 B2 * | 1/2021 | Kim | G01S 19/44 |
| 10,969,498 B2 | 4/2021 | Tao et al. | |
| 11,254,337 B2 * | 2/2022 | Craven | B61L 3/12 |
| 2014/0266907 A1 * | 9/2014 | Taylor, Jr. | G01S 5/10 342/387 |
| 2015/0198719 A1 * | 7/2015 | Mulherin | G01S 5/14 342/357.29 |
| 2016/0282128 A1 | 9/2016 | Zeng et al. | |
| 2017/0254901 A1 * | 9/2017 | Kim | G01S 19/43 |
| 2020/0189629 A1 | 6/2020 | Craven et al. | |
| 2021/0070335 A1 * | 3/2021 | Bjurström | B61L 27/30 |

FOREIGN PATENT DOCUMENTS

| | | | | |
|---|---|---|---|---|
| CN | 105270410 A | | 1/2016 | |
| CN | 105698787 B | | 3/2019 | |
| CN | 106918342 B | | 1/2020 | |
| CN | 111077558 A | * | 4/2020 | G01S 19/41 |
| EP | 2853922 A1 | * | 4/2015 | B61L 25/025 |
| EP | 2449411 B1 | | 1/2021 | |
| ES | 2650607 T3 | | 1/2018 | |
| JP | 5372802 B2 | | 12/2013 | |
| KR | 101326889 B1 | | 11/2013 | |
| KR | 101535873 B1 | | 7/2015 | |

OTHER PUBLICATIONS

Office Action dated Feb. 20, 2023 for corresponding Canadian Patent Application No. 3,118,285 (4 pages).

* cited by examiner

SYSTEM AND METHOD FOR DETERMINING VEHICLE POSITION BY TRIANGULATION

CROSS-REFERENCE TO RELATED APPLICATIONS

This application is a continuation-in-part of U.S. patent application Ser. No. 16/193,036, which was filed on 16 Nov. 2018, and the entire disclosure of which is incorporated herein by reference.

BACKGROUND

Technical Field

The subject matter described herein relates to determining the geographical position or location of a vehicle when global navigation satellite system (GNSS) signals (e.g., Global Position System) are unavailable and/or when dead-reckoning may not be reliable to verify the integrity (e.g., accuracy) of the geographical position of the vehicle for the purpose of controlling movement of the vehicle.

Discussion of Art

In the case where a vehicle cannot use GNSS signals to identify the current position of the vehicle (e.g. in a tunnel or a canyon), a control system onboard the vehicle may rely on dead-reckoning and a growing position offset to identify the location of the vehicle. This position offset, however, can grow at a rate of approximately four meters for every assumed kilometer traveled and can, therefore, become increasingly unreliable for the purpose of controlling movement of the vehicle.

It would, therefore, be desirable to provide a system and method that enables the geographical position of the vehicle to be accurately determined when GNSS signals are not available.

BRIEF DESCRIPTION

Generally, provided is a system and method for identifying the position of a moving vehicle when GNSS satellite signals are not available. The disclosed system and method finds particular application, and will be described hereinafter, in connection with identifying the position of a vehicle when Global Positioning System (GPS) satellite signals are not available. However, this is not to be construed in a limiting sense.

According to one preferred and non-limiting embodiment or example, disclosed herein is a method for determining the position of the vehicle based on triangulation distance determination.

In one example, stationary radio transmitters are provided (e.g., in a tunnel or other location where GNSS satellite signals are not available or are intermittently available), with the geographical location of each radio transmitter available to or programmed into the radio transmitter. The radio transmitters may be at wayside locations and not onboard any vehicle. For example, the radio transmitters may be coupled to a surface that is near but not on routes, tracks, etc. traveled by vehicles. The radio transmitters may be coupled with vertical or overhead surfaces (e.g., in tunnels, on buildings, etc.). Alternatively, one or more of the radio transmitters may be onboard a first vehicle while a second vehicle receives signals from the transmitters to determine the location or position of the second vehicle. The geographical location of each radio transmitter can be available to or programmed into the radio transmitter such as via GNSS satellite signals when available, via surveying, via operator input, or the like. Where there are multiple radio transmitters, the transmitters can be positioned a known distance apart. In an example, this fixed distance can be utilized along with one or more other distances determined in the manner described herein to determine the geographical location of the vehicle that is receiving signals emitted by the transmitters. Optionally, the transmitters may be transceivers (e.g., devices that both send and receive signals).

In one example, one or more radio receivers can be mounted on the vehicle, in an example, on or proximate to a leading edge of the vehicle. The vehicle optionally can be a multi-vehicle system, such as a train or a convoy of other types of vehicles. The receiver(s) can be positioned to have unobstructed access to the radio signal output by each radio transmitter. Where there are multiple radio receivers, the receivers can be mounted a fixed distance apart on the vehicle. In an example, this fixed distance can be utilized along with one or more other distances determined in the manner described herein to determine the geographical location of the vehicle. Optionally, the transmitters may be onboard the vehicle and the receivers can be off-board the vehicle. The onboard transmitters can emit signals that are received by the off-board receivers, and the off-board receivers can determine the location of the onboard transmitters as described herein. This location can then be communicated back to the vehicle and/or to another location (e.g., another vehicle, a back office or facility, a traffic monitoring system, a positive vehicle control (e.g., positive train control) system, etc.).

Each radio receiver can process a radio signal output by each radio transmitter and can determine (from a difference between phases of the radio signals received by the radio receiver) a distance from the radio receiver to one or both of the radio transmitters. This processing can occur sufficiently quickly (e.g., a few milliseconds or a few microseconds) that the distance that is determined is still valid for the purpose of vehicle control notwithstanding movement of the vehicle between the initial receipt of the radio signals and the determination of the distance(s). For the purpose of vehicle control during movement of the vehicle, even at high speeds (e.g., in excess of 200-250 kilometers per hour), the time to process the radio signals to determine the distance(s) can be considered real-time or substantially real-time (e.g., a few milliseconds or a few microsecond s).

In one example, each radio signal can have the geographical location of the radio transmitter transmitting the radio signal modulated thereon. Each geographical location can include a longitude and latitude of the radio transmitter transmitting the signal. The geographical location of each radio transmitter can be demodulated or otherwise obtained from the radio signal received from the radio transmitter.

In one example, where a first radio transmitter and first and second radio receivers are provided, using some combination of (1) the fixed distance between the two radio receivers, (2) the location of the first radio transmitter, and at least one of (3) a first distance from the first radio transmitter to the first radio receiver (determined from the phase difference between (a) the radio signal from the first transmitter and received by the first radio receiver and (b) the radio signal from the first transmitter and received by the second radio receiver) or (3) a second distance from the first radio transmitter to the second radio receiver (determined from the phase difference described above), triangulation distance determination can be used to determine a first geographical location of the train. For example, the phase difference can be used to calculate the difference in length between two of the three sides of a triangle, with the two receivers and the transmitter forming the three points of the triangle, two sides of the triangle being the first distance from the transmitter to the first receiver and the second distance from the transmitter to the second receiver, and the third side of the triangle being the known distance between the receivers. As another example, a set of two or more triangles using these points and distances may be determined using the phase difference. The set of triangle distances that are determined collapse or converge to a single solution using additional calculations of locations of the receivers. As a result, while there may be several triangles that may fit the difference in lengths between two of the sides of the triangle for the first triangle that is calculated or determined, one difference would fit the one or more additional triangles that are determined.

Additionally, in this example, where a second radio transmitter also is provided in addition to the first radio transmitter and the first and second radio receivers, using some combination of (1) the fixed distance between the first and second radio receivers, (2) the location of the first radio transmitter and/or the location of the second radio transmitter, and at least one of (3) the distance from the second radio transmitter to the first radio receiver (determined from a third phase difference between (c) the radio signal from the second transmitter and received by the first radio receiver and (d) the radio signal from the second transmitter and received by the second radio receiver), triangulation distance determination can be used to determine a second geographical location of the train.

In another example, where a first radio receiver and first and second radio transmitters are provided, using some combination of (1) the fixed distance between the first and second radio transmitters, (2) the geographic location of the first transmitter and/or the geographic location of the second transmitter, and at least one of the distance from the first radio transmitter to the first radio receiver (determined from a phase difference between the radio signals received by the first receiver), triangulation distance determination can be used to determine a third geographical location of the vehicle. For example, the phase difference can be used to calculate the difference in length between two of the three sides of a triangle, with the two transmitters and the receiver forming the three points of the triangle, two sides of the triangle being the first distance from the receiver to the first transmitter and the second distance from the receiver to the second transmitter, and the third side of the triangle being the known distance between the transmitters. As another example, a set of two or more triangles using these points and distances may be determined using the phase difference. The set of triangle distances that are determined collapse or converge to a single solution using additional calculations of locations of the receiver. As a result, while there may be several triangles that may fit the difference in lengths between two of the sides of the triangle for the first triangle that is calculated or determined, one difference would fit the one or more additional triangles that are determined.

Additionally, where a second radio receiver is also provided in addition to the first radio receiver and the first and second radio transmitters, using (1) the fixed distance between the first and second radio transmitters, (2) the geographic location of the first radio transmitter and/or the geographic location of the second radio transmitter, and at least one of the distance from the second radio transmitter to the first radio receiver (determined from a phase difference between the radio signals received by the first radio receiver from the first and second radio transmitters) or the distance from the second radio transmitter to the second radio receiver (determined from a phase difference between the radio signals received by the second radio receiver from the first and second radio transmitters), triangulation distance determination can be used to determine a second geographical location of the vehicle.

These first and second geographical locations of the vehicle can be the same. In another example, the first and second geographical locations of the vehicle can be different, and an average of the first and second geographical locations can be used as the geographical location of the vehicle.

Instead of the radio receivers being mounted on or proximate a leading edge of the vehicle, the radios receivers can, in another example, be mounted on or proximate a trailing edge of the vehicle (e.g., on the last vehicle of a multi-vehicle system).

The accuracy of the vehicle location that is determined can be a function of a wavelength of the radio signal that is used. In an example, it is envisioned that the accuracy may be better than using GPS. In an example, because of this accuracy, reliance on dead-reckoning to determine vehicle location can be reduced or avoided in areas where GNSS or GPS satellite signals are not available or are intermittently available (e.g., in tunnels or in canyons).

Each radio transmitter can be standalone device on a stationary wayside device that is off-board the vehicle or can be mounted on a mobile unit for temporary installation.

A method of determining a geographical location of a vehicle is provided and includes generating, by first and second radio transmitters located at first and second geographical locations, first and second radio signals having the respective first and second geographical locations modulated thereon, receiving the first and second radio signals by a first radio receiver mounted on the vehicle, calculating, by a controller mounted on the vehicle, a phase difference between the first and second radio signals, and calculating a first distance from the first radio receiver to the first radio transmitter and a second distance from the first radio receiver to the second radio transmitter based on or using a known distance between the first and second radio receivers and a time difference between receipt of the radio signals at the first and second radio receivers (e.g., a phase difference between the radio signals when received at the first radio receiver). The method also includes demodulating (or otherwise obtaining), by the controller, the first and second geographical locations from the first and second radio signals, and determining a first geographical location of the train, by the controller, from the first and second distance and the first and second geographical locations.

The method also can include receiving the first and second radio signals at a second radio receiver mounted on the vehicle, determining, by the controller and based on or using another time difference between receipt of these radio signals at the second radio receiver (e.g., another phase difference between the radio signals when received at the second radio receiver), a third distance from the second radio receiver to the first radio transmitter and a fourth distance from the second radio receiver to the second radio transmitter. The method also can include determining (by the controller) a second geographical location of the vehicle from the third and fourth distances and the first and second geographical locations of the first and second transmitters.

These first and second geographical locations of the vehicle can be the same or different locations. The geographical location of the vehicle can be a combination (e.g., average) of the first and second geographical locations. The controller can determine the first and/or second geographical locations of the vehicle using triangulation.

The first and/or second radio transmitters can be located in a tunnel. The first radio receiver can mounted on a lead vehicle or a trailing vehicle of a multi-vehicle system.

The first and second radio signals can be transmitted at the same or different times. These signals may have the same phase when transmitted but, due to difference distances between the transmitters and the receiver, the signals may have different phases when received at the same receiver. The difference in phases may represent a difference in time between how long it takes for each signal to be received by the receiver. Using the known propagation speed at which the radio signals move toward the receiver, the time difference (e.g., phase difference) can be used to triangulate the distance between the receiver and each of the transmitters.

In another example, a method of determining a geographical location of a vehicle includes generating a first radio signal having modulated thereon the first geographical location of the first radio transmitter by a first radio transmitter located at first geographical location, receiving, by first and second radio receivers mounted on the vehicle, the first radio signal, determining, by a controller disposed on the vehicle a first distance from the first radio receiver to the first radio transmitter and a second distance from the second radio receiver to the first radio transmitter based on phase difference between the cycles of the radio signal received at the first receiver and the signal received at the second receiver, demodulating (or otherwise obtaining), by the controller, the first geographical location of the first radio transmitter from the first radio signal, and determining, by the controller, a first geographical location of the vehicle from the first and second distances and the first geographical location.

The method also can include generating, by a second radio transmitter located at second geographical location, a second radio signal having modulated thereon the second geographical location of the second radio transmitter. The method also can include receiving, by the first and second radio receivers, the second radio signal and determining, by the controller, according to a phase difference between the second radio signal received at the first and second receivers, a third distance from the first radio receiver to the second radio transmitter and a fourth distance from the second radio receiver to the second radio transmitter. The method also can include demodulating (or otherwise obtaining), by the controller, the second geographical location of the second radio transmitter from the second radio signal and determining, by the controller, a second geographical location of the vehicle from the third and fourth distances and the second geographical location. The first and second geographical locations of the vehicle can be the same. The geographical location of the vehicle can be a combination (e.g., average) of the first and second geographical locations.

The controller can determine the first and/or second geographical locations of the vehicle via triangulation.

The first and second radio transmitters can be located in a tunnel or in a canyon. The first and second radio receivers can be mounted on a lead vehicle (e.g., locomotive) or a trailing vehicle of a multi-vehicle system.

The first and second radio signals can be transmitted at different times but with the same phase when transmitted during at least some time period.

The geographical location of the vehicle also can determined from satellite (e.g., GNSS or GPS) data.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
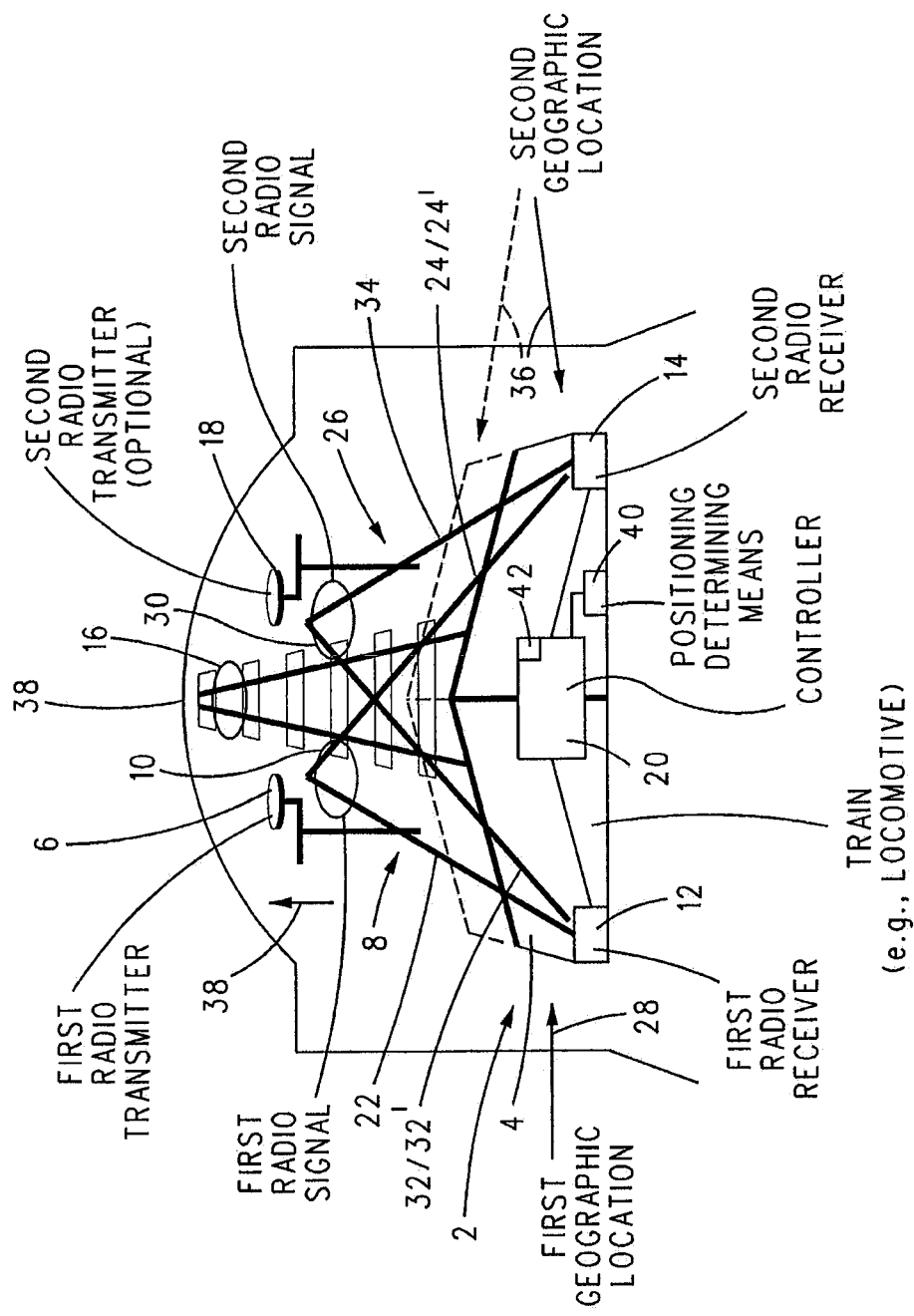
FIG. 1 is a schematic drawing of one example of a system for determining a geographical location of a vehicle.

Various examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply examples or aspects of the inventive subject matter.

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

The inventive subject matter described herein provides systems and methods that determine the location of a vehicle using at least one transmitter and at least two receivers. The transmitter may be off-board the vehicle and stationary, while the receivers are onboard the vehicle, or the transmitter may be onboard the vehicle while the receivers are off-board the vehicle and stationary. The transmitter emits electromagnetic oscillating signals (e.g., radio signals) having a phase and having the geographic location (e.g., coordinates) of the transmitter in the signals. The receivers are a known or set distance apart from each other. Because the receivers are in different locations, the signals are received by the receivers with different phases. For example, a signal can be sent from the transmitter and be received at a first receiver of the receivers before being received at a second receiver of the receivers. The time difference between when the receivers receive the signal results in the signal received at the first receiver having a different phase than the signal received at the second receiver. The systems and methods use (a) the phase difference, (b) a known, measured, or designated propagation rate (e.g., speed) at which the signal travels from the transmitter to the receivers, (c) the known or measured distance between the receivers, and (d) the location of the transmitter to determine the location of at least one of the receivers to determine the location of the vehicle. If the location of each receiver is determined, then an average of the receiver locations that are determined can be calculated and used as the vehicle location. If the receivers are onboard the vehicle, then the calculations described above can be performed onboard the vehicle (e.g., by a controller onboard the vehicle) with the location of the transmitter included in the signals. If the receivers are off-board the vehicle, then the calculations described above can be performed off-board the vehicle (e.g., by a controller that is not onboard the vehicle) with the locations of the receivers used instead of the location of the transmitter. The location of the vehicle that is determined can then be communicated to the vehicle (e.g., to the controller that is onboard the vehicle).

The inventive subject matter described herein also provides systems and methods that determine the location of a vehicle using at least two transmitters and at least one receiver. The transmitters may be off-board the vehicle and stationary, while the receiver is onboard the vehicle, or the transmitters may be onboard the vehicle while the receiver is off-board the vehicle and stationary. The transmitters emit electromagnetic oscillating signals (e.g., radio signals) having the same phase and having the geographic location (e.g., of the transmitter that emits the signal) in the signals. The transmitters are a known or set distance apart from each other. Because the transmitters are in different locations, the signals are received by the receiver with different phases. For example, a first signal can be sent from a first transmitter and be received at the receiver before the receiver receives a second signal sent from a second transmitter. The time difference between when the receiver receives the first and second signals results in the first signal having a different phase than the second signal. The systems and methods use (a) the phase difference, (b) a known, measured, or designated propagation rate (e.g., speed) at which the signals travel from the transmitters to the receiver, (c) the known or measured distance between the transmitters, and (d) the location of at least one of the transmitters to determine the location of the receiver to determine the location of the vehicle. If the receiver is onboard the vehicle, then the calculations described above can be performed onboard the vehicle (e.g., by a controller onboard the vehicle) using the known location of at least one of the transmitters. If the receiver is off-board the vehicle, then the calculations described above can be performed off-board the vehicle (e.g., by a controller that is not onboard the vehicle) using the known location of the receiver (instead of the location(s) of the transmitter(s)), and the vehicle location is then communicated to the vehicle (e.g., to the controller that is onboard the vehicle).

With reference to FIG. 1, in one example, in a method of determining a geographical location of a multi-vehicle system 2, a first radio transmitter 6 can be positioned at a first geographical location 8. The first radio transmitter can be programmed or configured to output a first radio signal 10 having a first geographical location of the first radio transmitter modulated thereon. A first vehicle of the vehicle system (e.g., a propulsion-generating vehicle 4, such as a locomotive) can have first and second radio receivers 12 and 14 mounted thereon. Alternatively, the vehicle system may be formed from a single vehicle. In an example, first and second radio receivers can be positioned laterally on opposite sides of the vehicle as shown in FIG. 1. In an example, first and second radio receivers can be positioned on the vehicle such that each radio receiver can have an unobstructed pathway for receiving the first radio signal from the first radio transmitter as the vehicle system travels on a route 16 toward the first radio transmitter in the direction of an arrow 38 in FIG. 1.

A controller 20 can be provided on the vehicle system for processing the output of the first radio receiver. Optionally, the controller may be off-board the vehicle. In an example, the controller can include one or more processors and memory. The controller can be part of or separate from the first radio receiver. The controller can be programmed or configured to process the output of the first radio receiver as described herein.

The controller can be programmed or configured to determine, according to a phase difference between the first radio signal received by the respective first and second radio receivers, a first distance 22 from first radio receiver to the first radio transmitter and a second distance from the second radio receiver to the first radio transmitter. In one example, the controller can be further programmed or configured to demodulate or read the first geographical location of first radio transmitter from the first radio signal.

The controller can be programmed or configured to determine a first geographical location 28 of the vehicle from the first and second distances and the first geographical location of the first radio transmitter.

Hence, as can be seen, a single radio transmitter and two radio receivers can be utilized to determine the geographical location of the vehicle 4. In an example, an optional second radio transmitter can be used with the first radio transmitter and the first and second radio receivers to determine the geographical location of vehicle 4.

In one example, as an aid to enabling the geographical location of the vehicle 4 to be accurately determined, a second radio transmitter can be provided at a second geographical location 26. The first and second geographical locations of the first and second transmitters can be proximate to or on opposite sides of the route. Optionally, the first and second transmitters can be on the same side of the route. At least the second radio transmitter can be positioned at the second geographical location relative to the first geographical location of the first radio transmitter that is suitable and/or desirable to enable the second radio transmitter to transmit a second radio signal 30 to the first and second radio receivers. The first geographical location and the second geographical location of the first and second transmitters can be anywhere relative to each other that enables the first and second radio receivers to have access to and receive the first and second radio signals.

On or about the same time that the first radio transmitter generates the first radio signal, the second radio transmitter can generate the second radio signal having the second geographical location of the second radio transmitter modulated thereon.

The first and second radio receivers can receive the second radio signal 30 in addition to receiving the first radio signal. In one example, the controller 20 can determine another phase difference between the second radio signal received by the respective first and second radio receivers. From this phase difference, a third distance 32 from the first radio receiver to the second radio transmitter and a fourth distance 34 from the second radio receiver to the second radio transmitter can be determined, as described above.

The controller can demodulate or otherwise determine the second geographical location of the second radio transmitter from the second radio signal. In an example, the controller then can determine a second geographical location 36 of the vehicle from the third and fourth distances and the second geographical location that was obtained from the second radio signal.

The second geographical location 36 can be the same as the first geographical location 28. In another example, the second geographical location 36 can be different than the first geographical location 28, as shown in broken lines in FIG. 1, based on, for example, the movement of the vehicle and the sequence of the controller processing the first and second radio signals.

Where the first and second geographical locations 28 and 36 determined by the controller from the first and second radio signals are different, the first and second geographical locations can be combined by the controller in any suitable and/or desirable manner to obtain an estimate or calculation of the actual geographical location of the vehicle. For example, the controller can calculate an average of the first and second geographical locations as an estimate or calculation of the geographical location of the vehicle or vehicle system.

Once the controller has determined the first geographical location 8 of the first radio transmitter and the first and second distances 22, 24 from the first radio signal, the controller can utilize a triangulation distance measurement technique to determine the first geographical location 28 of the vehicle or vehicle system, as described herein. In another example, once the controller has determined the second geographical location 26 of the second radio transmitter 18 and the third and fourth distances 32, 34 from the second radio signal 30, the controller can utilize the triangulation distance measurement technique to determine the second geographical location 36 of the vehicle or vehicle system. In an example, the controller can execute the triangulation distance measurement technique separately for each of the first radio signal and the second radio signal.

In one example, the first radio transmitter and the second radio transmitter (when provided) can be located in a tunnel, valley, urban area, or other location where receipt of GNSS signals may be blocked or impeded.

Each radio receiver can be mounted on the lead vehicle of the multi-vehicle system, on a trailing (e.g., last) vehicle of the multi-vehicle system, or on any other location on the vehicle system that is suitable and/or desirable. In an example, each radio receiver can be mounted an end of train (EOT) device that can be mounted on a trailing vehicle of a train.

In one example, the first and second radio signals can be transmitted at different times to facilitate processing of the first and second radio signals by the radio receiver 12 and/or 14.

The controller can use a geographical location of the vehicle or vehicle system determined by the controller prior to the first and/or second radio receivers receiving the first radio signal and/or the second radio signal to enable the controller to resolve potential ambiguity in determining the first geographical location 28, the second geographical location 36, or both the first and second geographical locations 28, 36 of the vehicle or vehicle system. In an example, this potential ambiguity can arise from the controller not being able to unambiguously determine whether the first and/or second geographical locations 28, 36 are on the side of the first radio transmitter shown in FIG. 1, or on the other side of the first radio transmitter (e.g., in the distance 16 shown in FIG. 1). This prior geographical location can be determined by the controller from an output of a position determining means 40, such as a GNSS receiver (e.g., GPS receiver). In an example, the position determining means can be a GPS receiver which can determine a prior geographical location of the vehicle system from GPS satellite signals received at a time when the GPS satellite signals are available. In another example, the location determining means can be a gyroscope, such as a MEMS-based gyroscope. In another example, the position determining means can be a compass or a magnetometer. In another example, the position determining means can be a route database 42 that includes a virtual instance (or model) of the route or track upon which the controller can monitor the progress of the vehicle or vehicle system moving on the physical instance of the route shown in FIG. 1.

In one example, the foregoing description describes the second ratio transmitter as optional, whereupon only a single, first radio transmitter and two radio receivers can be utilized to determine a geographical location of the vehicle or vehicle system.

In another example, the inventive system and method can determine a geographical location of the vehicle or vehicle system that utilizes two radio transmitters 6, 18 and a single radio receiver 12 or 14.

The first and second radio transmitters 6, 18 located at the first and second geographical locations 8, 26 can generate the first and second radio signals 10, 30 having the respective first and second geographical locations 8, 26 modulated thereon. The first radio receiver can receive the first and second radio signals. The controller 20 can determine, according to a phase difference between the first and second radio signals, the first distance from the first radio receiver to the first radio transmitter and a second distance 44 from the first radio receiver to the second radio transmitter.

In one example, the controller can obtain the first and second geographical locations 8, 26 of the first and second radio transmitters from the first and second radio signals. The controller can then determine a first geographical location 28 of the vehicle or vehicle system from the first and second distances 22, 44 and the first and second geographical locations 8, 26 obtained from the first and second radio signals.

As an aid to enabling the geographical location of the vehicle or vehicle system to be accurately determined, the second radio receiver optionally can be provided to receive the first and second radio signals. In an example, the controller can, according to a phase difference between the first and second radio signals received by the second radio receiver, determine a third distance 46 from the second radio receiver to the first radio transmitter and a fourth distance 34 from the second radio receiver to the second radio transmitter.

The controller can then determine a second geographical location 36 of the vehicle or vehicle system from the third and fourth distances 46, 34 and the first and second geographical locations 8, 26 obtained from the first and second radio signals.

In an example, and as discussed above, the first and second geographical locations 28, 36 of the vehicle or vehicle system can be the same or different. Where the first and second geographical locations 28, 36 determined in the above manner are different, the geographical location of the vehicle or vehicle system can be a combination of the first and second geographical locations 28, 36. In an example, this combination can be the average of the first and second geographical locations 28, 36.

Each geographical location of the vehicle or vehicle system can be determined via a triangulation distance measurement technique executed by the controller. In an example, the controller can determine a fixed distance between the first and second radio transmitters from the first and second geographical locations 8, 26 demodulated from the first and second radio signals. Via this fixed distance and distances 22, 44, the controller can determine the first geographical location 28 utilizing a triangulation distance measurement technique. Similarly, utilizing the fixed distance between the first radio transmitter and the second radio transmitter and the distances 46, 34, the controller can determine the second geographical location 36 utilizing the triangulation distance determining technique.

The first and second radio transmitters can be located in tunnel, valley, urban area, or other location where GNSS signals may be unavailable or impeded, or may be in another location.

Each radio receiver can be mounted to the lead vehicle of the multi-vehicle system (e.g., the vehicle 4), a trailing vehicle of the vehicle system, or any other location on the vehicle system. In an example, the first and second radio signals can be transmitted at the same time or at different times.

Figure 2A:
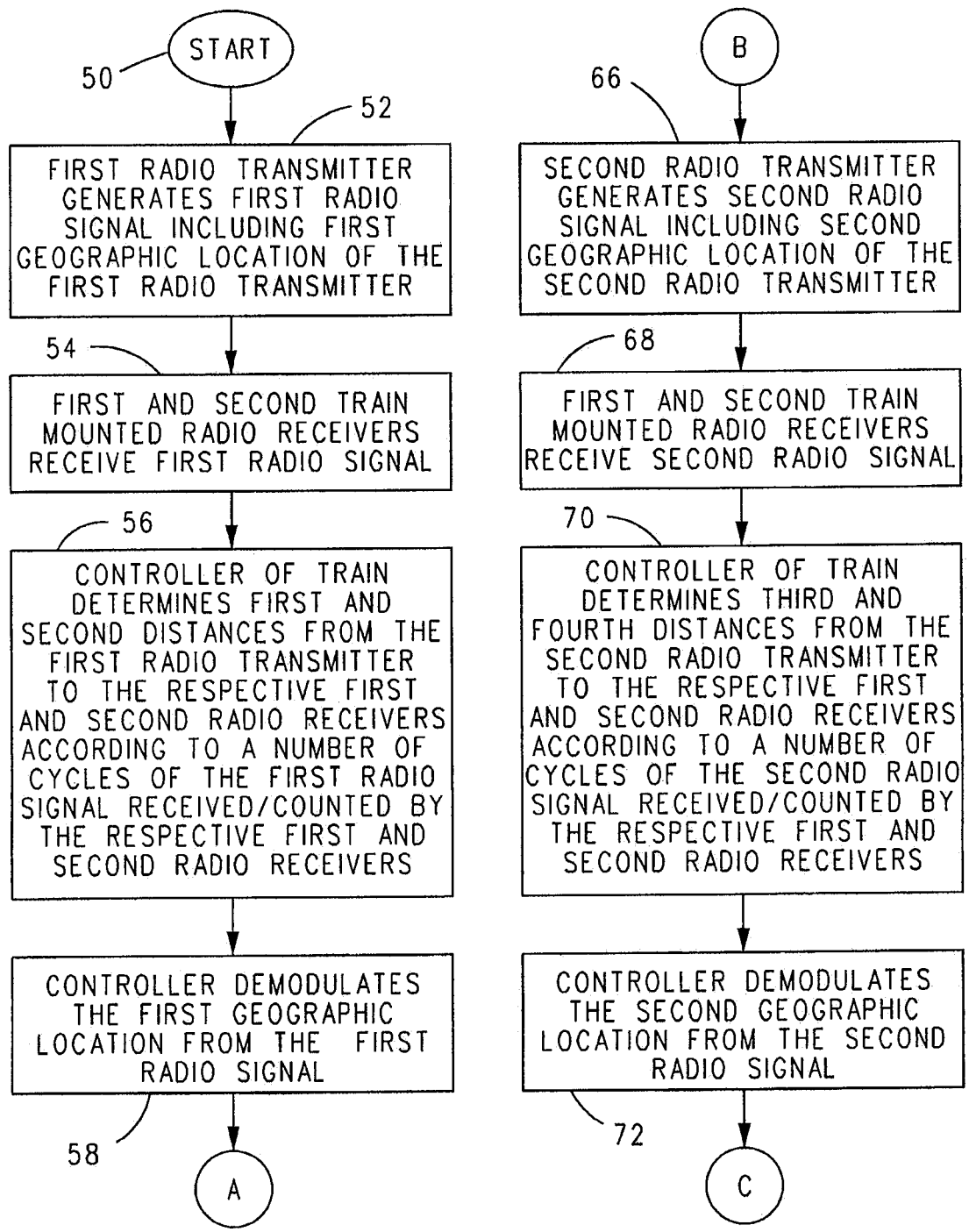
FIGS. 2A-2B are a flow diagram of one example of a method of determining a geographical location of a vehicle.
Figure 2B:
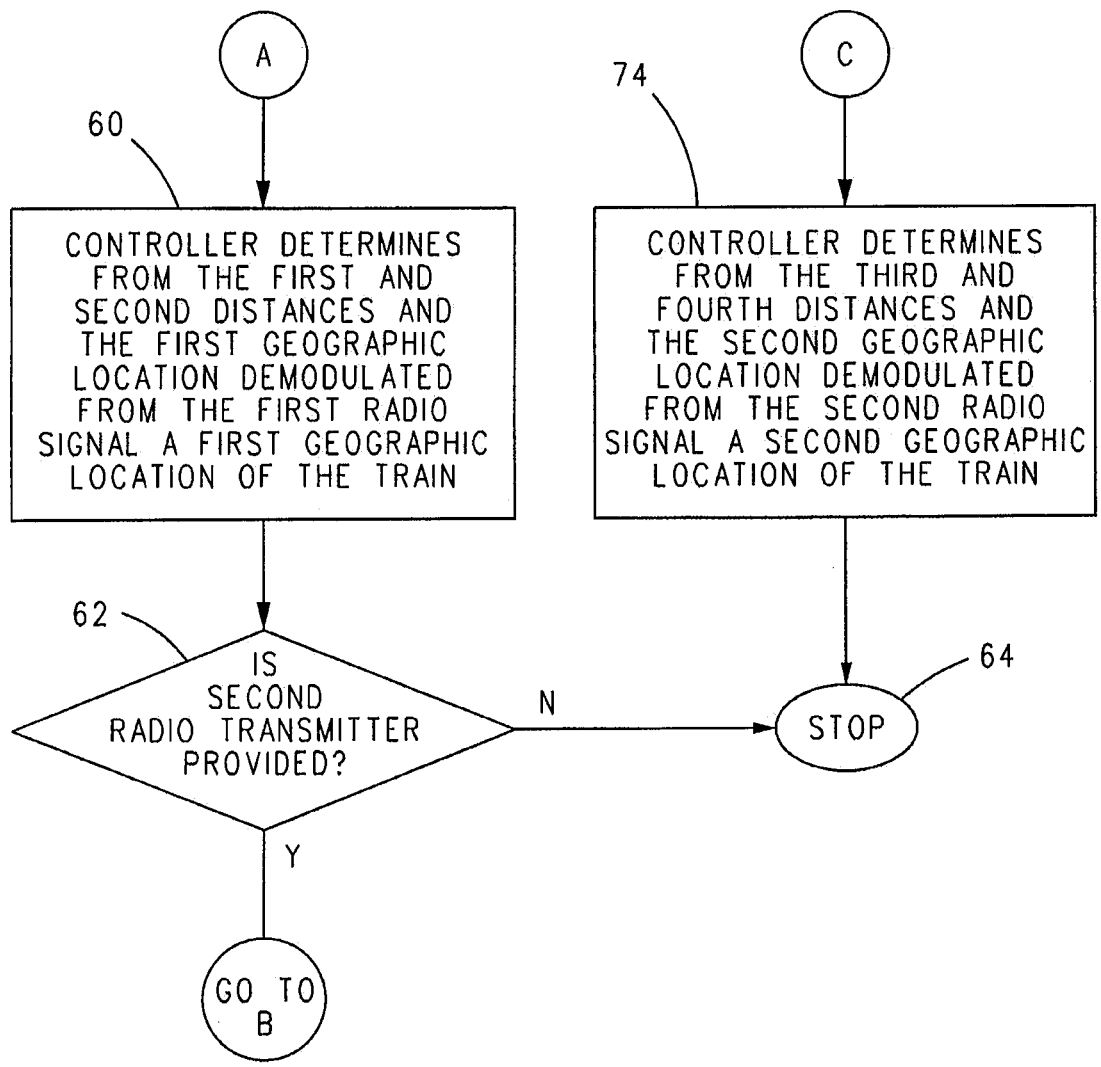

With reference to FIGS. 2A-2B and with continuing reference to FIG. 1, in one example, a method of determining a geographical location of a vehicle begins by advancing from 50 to 52 where a first radio transmitter located at a first geographical location 8 generates a first radio signal having the first geographical location 8 of the first radio transmitter modulated thereon. At 54, the first and second radio receivers mounted on the vehicle receive the first radio signal. At 56, the first and second distances 22, 24 from the first radio transmitter to the respective first and second radio receivers are determined according to the phase difference between the first radio signal as received by the first and second radio receivers.

At 58, the first geographical location 8 is demodulated from the first radio signal received by the first and/or second radio receivers. At 60, the first geographical location 28 of the vehicle or vehicle system is determined from the first and second distances 22, 24 (determined at 56) and the first geographical location 8 (determined at 58).

If, at 62, it is determined that the second radio transmitter is not provided, the method can advance toward a stop or termination of the method at 64 or can repeat one or more previous operations. But if the second radio transmitter is provided, the method can advance toward 66 where the second radio transmitter generates the second radio signal having the geographical location 26 of the second radio transmitter modulated on the second radio signal.

At 68, the first and second radio receivers receive the second radio signal. At 70, the third and fourth distances 32, 34 from the second radio transmitter to the respective first and second radio receivers are determined using a phase difference between the second radio signal as received by the first and second radio receivers. At 72, the second geographical location 26 is demodulated from the second radio signal. At 74, a second geographical location 36 of the vehicle or vehicle system is determined from the third and fourth distances 32, 34 (determined at 70) and the second geographical location 26 (determined at 72). The method then advances to an end or termination at 64, or can repeat one or more previous operations.

In one example, each geographical location can be determined via a triangulation distance measurement technique. The actual geographical location of the vehicle system can be the first geographical location 28, the second geographical location 36, or some combination (e.g., average) of the first and second geographical locations determined at 60 and/or 74.

Figure 3A:
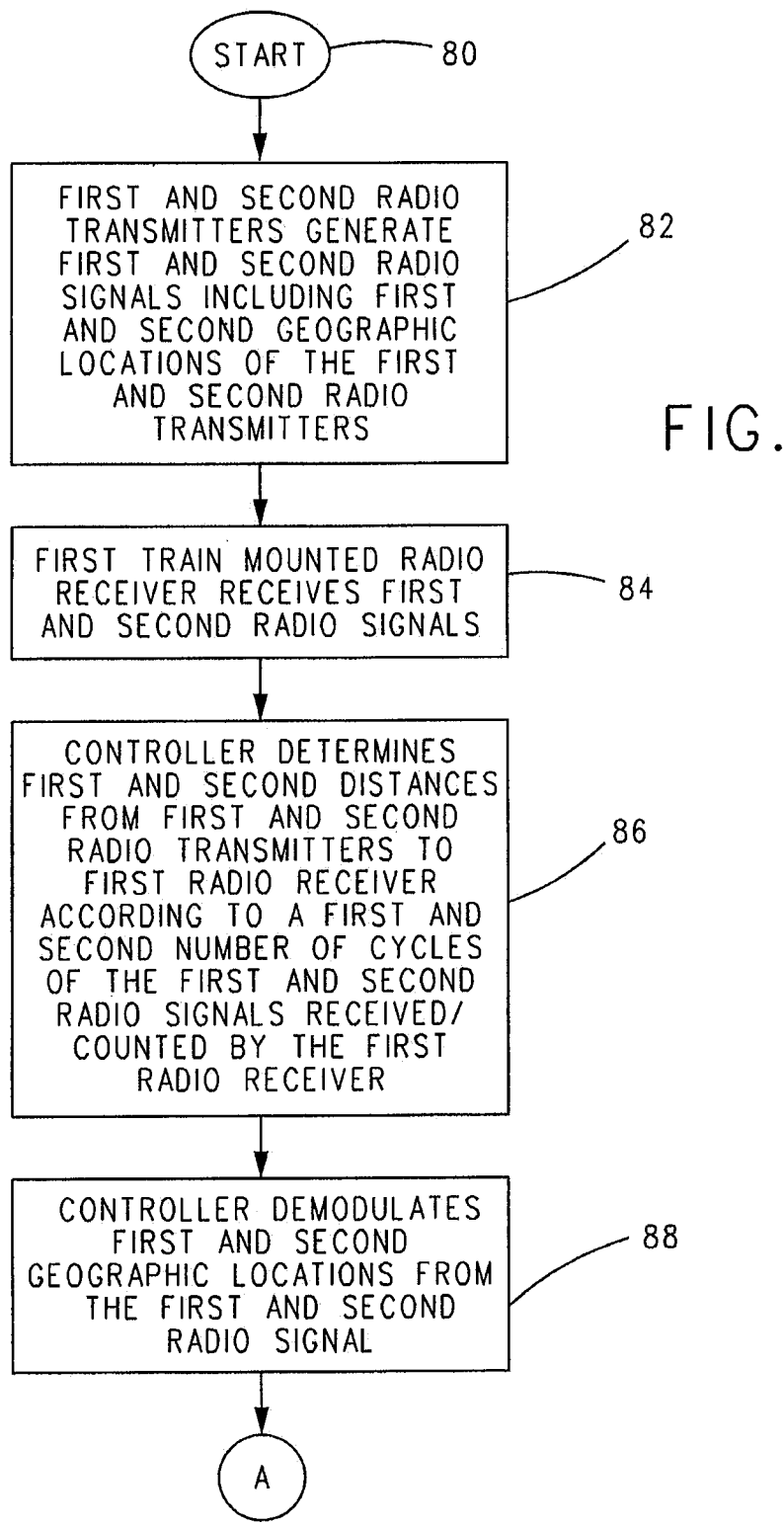
FIGS. 3A-3B are a flow diagram of one example of a method of determining a geographical location of a vehicle.
Figure 3B:
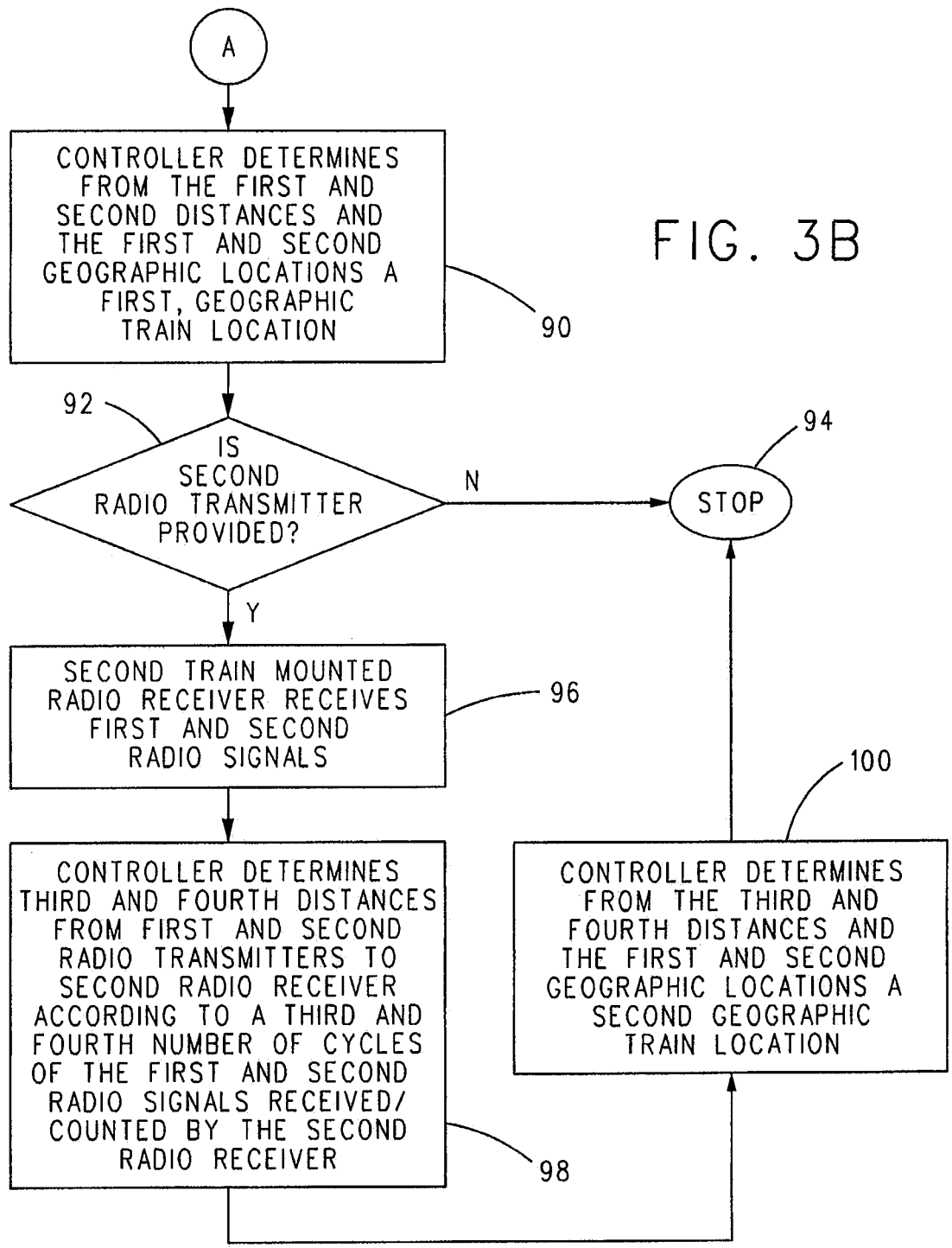

With reference to FIGS. 3A and 3B and continuing reference to FIG. 1, in one example, a method of determining a geographical location of a vehicle system or vehicle advances from 80 to 82 where the first and second radio transmitters generate first and second radio signals having first and second geographical locations 8, 26 of the first and second radio transmitters modulated thereon. At 84, a first vehicle-mounted radio receiver receives the first and second radio signals. At 86, first and second distances 22, 44 from the first and second radio transmitters to the first radio receiver are determined according to a phase difference between the first and second radio signals received by the first radio receiver.

At 88, the first and second geographical locations 8, 26 are demodulated or otherwise obtained from the first and second radio signals. At 90, a first geographical location 28 of the vehicle or vehicle system is determined from the first and second distances 22, 44 (determined at 86) and the first and second geographical locations 8, 26 obtained from the first and second radio signals (determined at 88).

If, at 92, it is determined that the second radio receiver is not provided, the method can terminate or otherwise end at 94, or may repeat one or more prior operations. If, however, the second radio receiver is provided, the method can advance toward 96 where the second radio receiver receives the first and second radio signals from the first and second radio transmitters. At 98, third and fourth distances 46, 34 from the first and second radio transmitters to the second radio receiver 14 are determined according to a phase difference between cycles of the first and second radio signals received by the second radio receiver. At 100, a second geographical location 36 of the vehicle or vehicle system is determined from the third and fourth distances 46, 34 (determined at 98) and the first and second geographical locations 8, 26 (obtained at 98). The method then advances to stop or terminate at 94, or can repeat one or more prior operations.

The actual geographical location of the vehicle system can be the first geographical location, the second geographical location, or the combination (e.g., average) of the first and second geographical locations. Each geographical location of the vehicle system can be determined via a triangulation distance measurement technique.

As can be seen, disclosed herein is a system and method for identifying the position of a vehicle system when GNSS satellite signals are not available. Triangulation between two radio transmitters and a single vehicle-mounted radio receiver, between a single radio transmitter and two vehicle-mounted radio receivers, or between two radio transmitters and two vehicle-mounted radio receivers can be utilized to determine the geographical location of the vehicle system. The vehicle location that is determined for the vehicle or vehicle system can be used to control or change movement of the vehicle system. For example, the vehicle system can change direction, speed up, slow down, or the like, based on the location that is determined and/or changes in the locations that are determined, to remain on course toward a destination, to arrive at the destination within a designated period of time, to avoid collision with another object or vehicle system, or the like.

Although the inventive subject matter has been described in detail for the purpose of illustration based on what is currently considered to be the most practical, preferred, and/or non-limiting embodiments, examples, or aspects, it is to be understood that such detail is solely for that purpose and that the inventive subject matter is not solely limited to the disclosed embodiments, examples, or aspects, but, on the contrary, is intended to cover modifications and equivalent arrangements that are within the spirit and scope of the appended claims. For example, it is to be understood that the inventive subject matter contemplates that, to the extent possible, one or more features of the embodiment, examples, or aspects can be combined with one or more features of any other embodiment, example, or aspect.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a first receiver configured to be disposed onboard a vehicle while receiving a first radio signal;
    a second receiver configured to be onboard the vehicle while receiving a second radio signal, one or both of the first radio signal or the second radio signal including a transmitter location of a transmitter that emitted the first radio signal and the second radio signal; and
    a controller configured to calculate a phase difference between the first radio signal and the second radio signal, the controller configured to determine a receiver distance between the first receiver and the second receiver, the controller configured to determine a vehicle location of the vehicle using (a) the phase difference, (b) the receiver distance, and (c) the transmitter location.

2. The system of claim 1, wherein the controller is configured to change movement of the vehicle based on the vehicle location.

3. The system of claim 1, wherein the controller is configured to determine the vehicle location using (a) the phase difference, (b) the receiver distance, (c) the transmitter location, and (d) a propagation rate of the first radio signal and the second radio signal.

4. The system of claim 1, wherein the transmitter is a first transmitter, the transmitter location is a first transmitter location, the vehicle location is a first vehicle location, the phase difference is a first phase difference, the first receiver is configured to receive a third radio signal that is emitted by a second transmitter, the second receiver is configured to receive a fourth radio signal that is emitted by the second transmitter and that includes a second transmitter location of the second transmitter, at least one of the third radio signal or the fourth radio signal includes a second transmitter location of the second transmitter, the controller is configured to determine a second vehicle location using a second phase difference between the third radio signal and the fourth radio signal.

5. A method comprising:
    generating, by first and second radio transmitters located at first and second transmitter geographical locations, first and second radio signals having modulated thereon the respective first and second transmitter geographical locations;
    receiving, by a first radio receiver mounted on a vehicle, the first and second radio signals;
    determining, by a controller mounted on the vehicle, a first distance between the first radio receiver to the first radio transmitter and a second distance between the first radio receiver to the second radio transmitter based on a phase difference between the first and second radio signals;
    demodulating, by the controller, the first and second geographical transmitter locations from the first and second radio signals; and
    determining, by the controller, a first vehicle geographical location of the vehicle from the first and second distances that are determined and the first and second transmitter geographical locations that are demodulated from the first and second radio signals.

6. The method of claim 5, wherein the phase difference is a first phase difference, and further comprising:
receiving, by a second radio receiver mounted on the vehicle, the first and second radio signals;
determining, by the controller, a third distance between the second radio receiver to the first radio transmitter and a fourth distance between the second radio receiver to the second radio transmitter based on a second phase difference between the first and second radio signals; and
determining, by the controller, a second vehicle geographical location of the vehicle from the third and fourth distances that are determined and the first and second transmitter geographical locations that are demodulated.

7. The method of claim 6, wherein the first and second vehicle geographical locations of the vehicle are determined to be the same.

8. The method of claim 6, further comprising determining a third vehicle geographical location of the vehicle based on a combination of the first and second vehicle geographical locations.

9. The method of claim 5, wherein the vehicle is an automobile.

10. The method of claim 5, wherein the vehicle is a rail vehicle.

* * * * *